Nov. 9, 1954     W. D. LUDWIG     2,693,716
VALVE OPERATING PEDAL
Filed Aug. 4, 1950
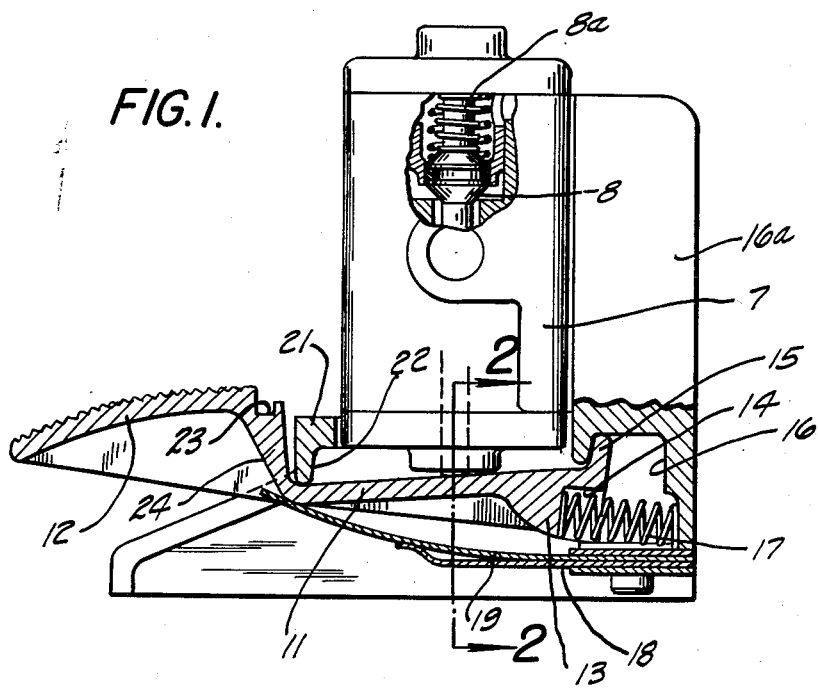
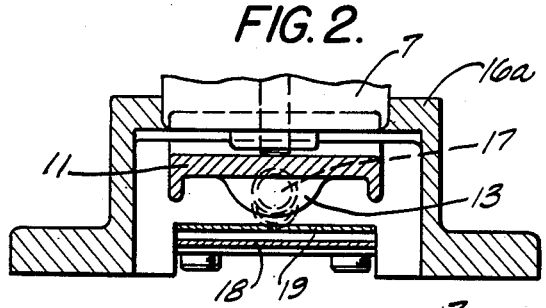
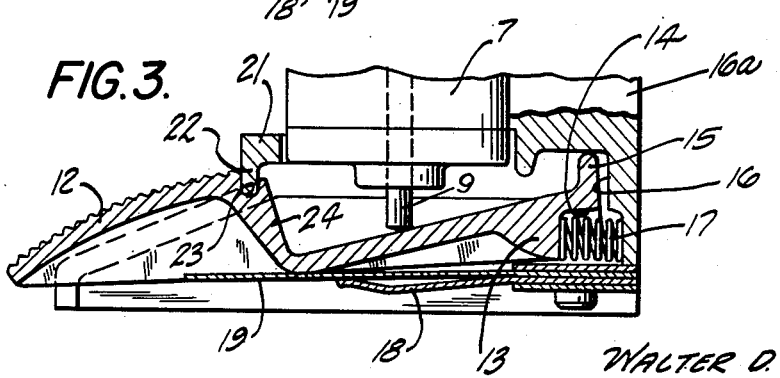
INVENTOR.
WALTER D. LUDWIG.
BY
Thos. J. Donnelly
ATTORNEY.

United States Patent Office 2,693,716
Patented Nov. 9, 1954

2,693,716

VALVE OPERATING PEDAL

Walter D. Ludwig, Royal Oak, Mich.

Application August 4, 1950, Serial No. 177,640

3 Claims. (Cl. 74—512)

My invention relates to a new and useful improvement in a valve operating pedal adapted for operating a slidable valve in one direction and so arranged and constructed that when the pedal is released it will automatically move the valve in one direction against a spring pressure which normally tends to move the valve in the opposite direction.

Another feature of the invention is a valve pedal so constructed and arranged that it may be moved into releasing position to permit the spring operating upon the slidable valve to move the valve.

Another feature of the invention is that the pedal when moved to releasing position may be moved into position for engaging a body to retain the pedal in releasing position.

Another feature is that the pedal when in this retained position may be rocked downwardly and automatically moved outwardly in response to spring pressure and then moved upwardly to slide the valve in the opposite direction.

Other features will appear hereinafter.

It is recognized that various modifications and changes may be made in the detail of structure illustrated without departing from the invention and it is intended that the present disclosure shall be considered the preferred embodiment of the invention.

Forming a part of this specification are drawings in which,

Fig. 1 is a longitudinal central vertical sectional view of the invention showing it applied, Fig. 2 is a fragmentary sectional view taken on line 2—2 of Fig. 1, Fig. 3 is a view similar to Fig. 1 showing the pedal in a different position.

In the drawings I have shown a valve housing 7 in which is mounted a slidable valve 8 moved in one direction by spring 8a. The valve operating pedal comprises the bar or plate 11 having the treadle or foot engaging portion 12 and provided adjacent its end with the boss 13 in which is formed a recess 14. Projecting upwardly from the end of the bar or plate 11 is a lip 15 which is engaged in the recess 16 formed in the housing support 16a. One end of a coil spring 17 engages in the recess 14 and the other end bears against a face of the support 16a.

Mounted on this support at one of their ends are leaf springs 18 and 19. The end of the leaf spring 19 is in engagement with the end of the bar or plate 11 and serves to tend normally to rock this member upwardly into the position shown in Fig. 1. Forming a part of the support 16a is a platform 21 projecting downwardly from which is a flange 22. An upwardly turned portion 24 is formed on the end of bar or plate 11 and is provided at its upper end with a notch 23.

The valve 8 is mounted on the slidable rod 9. When the pedal is in the position shown in Fig. 1 this rod 9 is thrust upwardly against the compression of spring 8a so that the valve 8 is held in open position. When it is desired to close the valve the operator steps on the treadle portion 12 of the pedal and rocks it downwardly whereupon the rod 9 moves downwardly in response to the pressure of the spring 8a so that the valve 8 moves into closed position. In order to retain this pedal in this releasing position the operator shoves inwardly on the treadle portion 12 so as to move the member 11 to the right of Fig. 1. This movement of course effects a compressing of the spring 17. When the movement of the member 11 to the right of Fig. 1 is such that the notch 23 is in registration with the flange 22, the flange 22 may then engage in the recess 23 so as to retain this pedal in valve releasing position. In order to move the valve to closed position the operator steps on the treadle portion 12 to rock the member 11 downwardly against the pressure of springs 18 and 19 and then the spring 17 forces the member 11 to move to the left of the drawings so that the inner face of the portion 24 clears the flange 22 whereupon the pedal moves into the position shown in Fig. 1 in response to the pressure of the springs 18 and 19. These springs 18 and 19 of course have greater strength than the spring 8a.

In this way I have provided a simple and quickly operated valve operating pedal while at the same time I have provided a simple, effective, and sure means for locking the pedal in valve releasing position.

What I claim is:

1. A device of the class described adapted for use with a valve mechanism, embodying a slidable valve stem provided with a spring normally tending to slide said valve stem downwardly, comprising: a support for supporting said valve mechanism and having a front side and a rear side; a pedal rockably mounted adjacent one end at the rear side of said support and extending forwardly of the forward side of said support and rockable upwardly and downwardly at its forward end on said support and longitudinally movable and engageable at its upper face with said stem for, upon rocking upwardly, moving said stem upwardly against the compression of the spring on said stem; a spring engaging at one end said support and projecting forwardly therefrom and engaging at its opposite end the rear end of said pedal for normally urging said pedal forwardly of said support; said support having a recess formed therein; a lip on the rear end of said pedal for engaging in said recess and limiting the forward movement of said pedal; and a spring connected to said support at its rear end and projecting forwardly therefrom, and engaging at its forward end the under surface of said pedal for normally retaining said pedal rocked upwardly.

2. A device of the class described adapted for use with a valve mechanism embodying a slidable valve stem provided with a spring normally tending to slide said valve stem downwardly, comprising: a support for supporting said valve mechanism and having a front side and a rear side; a pedal rockably mounted adjacent one end at the rear side of said support and extending forwardly of the forward side of said support and rockable upwardly and downwardly at its forward end on said support and longitudinally movable and engageable at its upper face with said stem for, upon rocking upwardly, moving said stem upwardly against the compression of the spring on said stem; a spring engaging at one end said support and projecting forwardly therefrom and engaging at its opposite end the rear end of said pedal for normally urging said pedal forwardly of said support, said support having a recess formed therein; a lip on the rear end of said pedal for engaging in said recess and limiting the forward movement of said pedal; a spring connected to said support at its rear end and projecting forwardly therefrom and engaging at its forward end the under surface of said pedal for normally retaining said pedal rocked upwardly; said pedal having a recess formed in its upper face; a downwardly projecting flange on said supporting member at the forward side thereof, and engageable in said recess in said pedal upon rearward longitudinal movement of said pedal subsequent to downward rocking of the same for retaining said pedal in downwardly rocked position.

3. A device of the class described adapted for use with a valve mechanism embodying a slidable valve stem provided with a spring normally tending to slide said valve stem downwardly, comprising: a support for supporting said valve mechanism and having a front side and a rear side; a pedal rockably mounted adjacent one end at the rear side of said support and extending forwardly of the forward side of said support and rockable upwardly and downwardly at its forward end on said support and longitudinally movable and engageable at its upper face with said stem for, upon rocking upwardly, moving said stem upwardly against the compression of the spring on said stem; a spring engaging at one end said support and projecting forwardly therefrom and engaging at its opposite end the rear end of said pedal for normally urging said pedal forwardly of said support, said support having a recess formed therein; a lip on the rear end of said pedal for engaging in said recess and limiting the forward movement of said pedal; a spring connected to said support at its rear end and projecting forwardly therefrom and engaging at its forward end the under surface of said pedal for normally retaining said pedal rocked upwardly, said pedal having a recess formed in its upper face; a downwardly projecting flange on said supporting member at the forward side thereof, and engageable in said recess in said pedal upon rearward longitudinal movement of said pedal subsequent to downward rocking of the same for retaining said pedal in downwardly rocked position; and an upwardly turned portion on said pedal adjacent its forward end extending forwardly of said flange and normally preventing rearward longitudinal movement of said pedal prior to downward rocking movement of the same.

References Cited in the file of this patent

UNITED STATES PATENTS

| Number | Name | Date |
|---|---|---|
| 238,926 | Lang | Mar. 15, 1881 |
| 1,333,776 | Picotte | Mar. 16, 1920 |
| 1,700,643 | Nordell | Jan. 29, 1929 |
| 1,708,820 | Wright | Apr. 19, 1929 |
| 1,856,767 | Jasper | May 3, 1932 |
| 2,179,621 | Fletcher | Nov. 14, 1939 |
| 2,268,699 | Cotner | Jan. 6, 1942 |
| 2,287,011 | Beebe | June 23, 1942 |
| 2,384,805 | Arens | Mar. 7, 1942 |
| 2,473,845 | Barsun | June 21, 1949 |
| 2,488,637 | Moss | Nov. 22, 1949 |